United States Patent
Bansal et al.

[11] Patent Number: 6,016,338
[45] Date of Patent: Jan. 18, 2000

[54] LOTTERY METHOD AND APPARATUS HAVING A TIERED PRIZE SCHEME

[75] Inventors: Pradeep K. Bansal, Dayton; Lee Begeja, Gillette; Carroll W. Creswell, Basking Ridge, all of N.J.

[73] Assignee: AT&T Corp., New York, N.Y.

[21] Appl. No.: 09/274,135

[22] Filed: Mar. 22, 1999

[51] Int. Cl.[7] .................................................. H04M 11/00
[52] U.S. Cl. ........................... 379/93.13; 463/17; 463/41
[58] Field of Search ............................. 379/93.13, 93.12, 379/90.01, 110.01; 273/183.1; 463/17, 41

[56] References Cited

U.S. PATENT DOCUMENTS

| | | | |
|---|---|---|---|
| 4,792,968 | 12/1988 | Katz | 379/92 |
| 4,845,739 | 7/1989 | Katz | 379/92 |
| 4,996,705 | 2/1991 | Entenmann et al. | 379/91 |
| 5,073,929 | 12/1991 | Katz | 379/93 |
| 5,083,272 | 1/1992 | Walker et al. | 364/412 |
| 5,128,984 | 7/1992 | Katz | 379/92 |
| 5,251,252 | 10/1993 | Katz | 379/92 |
| 5,327,485 | 7/1994 | Leaden | 379/95 |
| 5,354,069 | 10/1994 | Guttman et al. | 273/439 |
| 5,403,999 | 4/1995 | Entenmann et al. | 235/379 |
| 5,608,785 | 3/1997 | Kasday | 379/93.13 |
| 5,713,795 | 2/1998 | Kohorn | 463/17 |
| 5,835,576 | 11/1999 | Katz | 379/93.13 |

FOREIGN PATENT DOCUMENTS

| | | | |
|---|---|---|---|
| 2300816 | 11/1996 | United Kingdom | 273/138.1 |

*Primary Examiner*—Wing F. Chan

[57] ABSTRACT

A method and apparatus for rewarding communication service users can enter a call into a lottery, if the call is eligible. A party associated with the call for purposes of the lottery is identified; and if the call has won the lottery, the lottery winner is advised of the winning status. The odds of winning a lottery for the call can be adjusted based on a participation history for the associated party including a history of past lottery prizes won and refused. Thus, a lottery winner can be given the opportunity to refuse a lottery prize won in return for a chance to win a better prize in a future lottery. Prizes won by the lottery winner can also be matched to the lottery winner's preferences and/or the lottery winning call.

22 Claims, 2 Drawing Sheets

LOTTERY METHOD AND APPARATUS HAVING A TIERED PRIZE SCHEME

RELATED APPLICATIONS

This application is related to the following concurrently filed, commonly assigned applications: entitled "Method And Apparatus For Rewarding Groups Of Communication Service Users;" entitled "Method And Apparatus For Determining A Caller's Odds For Winning A Lottery Based On Caller History;" entitled "Method And Apparatus For Determining A Call-Based Lottery Winner's Prize Tier Based On Caller Participation History;" and entitled "Method And Apparatus For Determining A Caller's Eligibility For A Lottery And Advising Lottery Winner During A Same Call."

BACKGROUND OF THE INVENTION

1. Field of Invention

This invention relates to a method and apparatus for rewarding communication service users that enter calls into a lottery and reward lottery winners using a tiered prize scheme.

2. Description of Related Art

Traditional lottery systems, or other similar games of chance, require players to purchase lottery tickets or make some other similar directed action to enter a lottery. For example, U.S. Pat. No. 5,403,999 to Entenmann et al. describes a system that allows a player to enter a lottery by calling a specific telephone number and entering the lottery over the telephone. Thus, in the Entenmann system, the player can enter, win and be advised of winning the lottery during a single telephone call specifically made to enter the lottery.

SUMMARY OF THE INVENTION

The invention provides a method and apparatus for rewarding communication service users that enter selected calls into a lottery and award lottery winners using a tiered prize scheme. The calls can be made using a telecommunications service or any other type of communication service including wired and wireless communication services, such as radio communication services, computer networks, the Internet, etc. The lottery winners can be any person or entity associated with a call, such as the caller, called party, a person or entity that owns a communication device used by the caller or called party, etc. Thus, a caller need not make a specific directed action, e.g., telephone a specific telephone number, to enter and win a lottery. Instead, according to at least one aspect of the invention, a call can be entered into and win a lottery when a caller calls any called party.

When a call is made by a caller to communicate with a called party, a person, group or other entity is associated with the call for lottery purposes. The person, group or entity associated with the call for lottery purposes can be identified as, or as including, the caller, the called party or some other entity, such as the owner of a communication device (e.g., telephone) used to make the call. A determination is also made whether the call is eligible for a lottery. This determination can be made based on various criteria, e.g., the call is a credit card telephone call, a regular long-distance call, a dial-around code based call, the time of day, a "call destination", etc.

If the call is eligible for entry into a lottery, a determination can next be made whether the call has won the lottery. This determination can be adjusted based on various criteria, including a participation history of the person, group or entity associated with the call for lottery purposes, which can include a total number of calls made over a past period of time, e.g., the last 30, 60 or 90 days, a total amount of call time used by the person, group or entity, the types of calls made/received, a number of past lotteries entered, a number of past lotteries won, a type of calls made, call destination information, a time of day or day, a dial-around code for past calls, etc.

For example, the call's odds for winning the lottery can be adjusted based on the participation history of the person, group or entity associated with the call for lottery purposes. As one example, if a lottery has defined odds for winning, e.g., one in ten thousand, the call could be provided with two or more entries into the lottery to adjust the odds of winning. Alternately, the call could be given one entry into the lottery and the odds for winning the lottery could be adjusted in another way. By adjusting the odds for winning, frequent callers of the communication system can be rewarded with increased odds of winning as compared to less frequent users. The person, group or entity associated with the call for lottery purposes, now the lottery winner, can be advised that the call has won the lottery during the call that entered the group into the lottery. However, this is not necessary and the lottery winner can be advised at some later time.

When the lottery winner is advised of the winning status, a prize or group of prizes to be awarded to the lottery winner can also be identified. The lottery winner can be given the opportunity to either accept the prize(s) or return the prizes in exchange for possibly winning a better prize and/or better odds of winning a better prize during a later call. Thus, the prize awarded to a lottery winner can be determined based on past lotteries won by the lottery winner and the prize or prizes returned by the lottery winner.

A prize or prizes awarded to a lottery winner can be selected from a changing inventory of prizes based on various criteria, such as a geographical origin of the call, a geographical destination of the call, a type of services provided during the call, etc. For example, if a caller calls a specific theater for any purpose, not just to buy tickets to a show, the caller could be entered into and win a lottery. A prize selected for award to the caller could be determined based on the call destination of the call, i.e., the theater. Thus, the caller could be awarded with a prize provided by the theater, such as free tickets to a show that evening. Likewise, the caller could be awarded with a prize for free limousine transportation between the caller's home and the theater, or any other prize(s).

These and other aspects of the invention will be appreciated and/or will be obvious in view of the description detailed below.

BRIEF DESCRIPTION OF THE DRAWINGS

The invention is described below with reference to the following drawings in which like reference numerals refer to like elements.

DETAILED DESCRIPTION OF PREFERRED EMBODIMENTS

The invention is described below in connection with a telecommunication system. That is, as described below, callers make telephone calls to request communication services and communicate with a desired called party. However, it will be appreciated that the invention can be used with other types of communication systems, including wired and wireless communication systems, computer or other similar networks such as the Internet, etc. For example, the invention could be used as part of an Internet service provider (ISP) system such that each time a user accesses the Internet, a particular web site, a particular number or combination of web sites, or other similar computer network through the ISP's system, the user can be entered into and win a lottery. The user can access the Internet, computer network or other information source through a cable, satellite or other network or combination of networks. Likewise, communication service users that connect to a particular Internet web site, or view/interact with a particular television or other communication channel (either digital or analog), can be entered into and win a lottery. For example, users could be rewarded for viewing a particular television or other similar communication channel. Thus, the invention is not limited to use with telecommunication systems.

The term called party is used in this description to refer to any person, entity, communication device or other communication destination. Likewise, the term call is used to refer to any type of communications between a caller and a called party, not just telephone calls. Thus, a caller can "call" a called party over a telecommunications network, a computer network, the Internet, etc.

Figure 1:
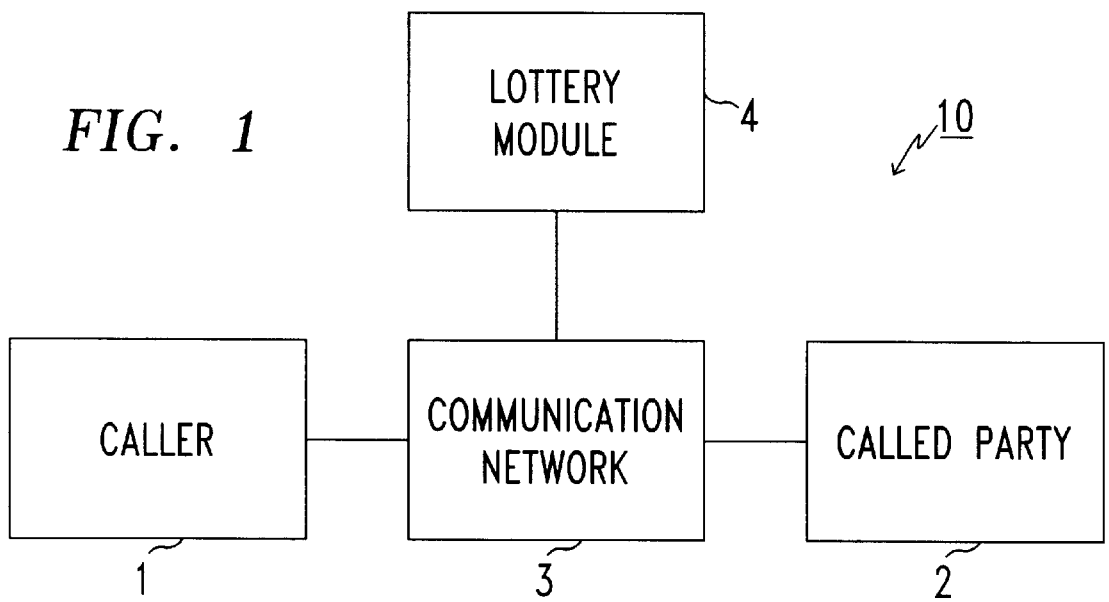
FIG. 1 is a schematic block diagram of a communication system configured in accordance with the invention.

FIG. 1 is a schematic block diagram of a communications system 10 configured in accordance with the invention. A caller 1 makes a request for communication services so that the caller 1 can communicate with a desired called party 2. The caller 1 and/or the called party 2 can be a person or communication device, as desired. The caller 1 and/or the called party 2 can use, or can include, any number of different types of communication devices, including wired and wireless telephones, facsimile machines, modems, programmed general purpose computers, computer software modules and associated data processing apparatus, etc. Thus, any one- or two-way communication device can be used for communication between the caller 1 and the called party 2.

The caller 1's request for communication services can take different forms, depending upon the type of communication network 3 used to provide the communication services. In this example, the communication network 3 is a switched telecommunications network, and so the request for communication services can include a dialed telephone number. However, the communication network 3 can include other communication systems, and the request for communication services will likely change accordingly.

When the communication network 3 receives the call request and provides communication services, e.g., sends communication information between the caller 1 and the called party 2, a lottery module 4 is notified of the call. The lottery module 4 then determines a person, group or other entity associated with the call for purposes of a lottery, and determines if the call is eligible for entry into a lottery. In this example, a possible other entity associated with the call could be a person, group or business entity that maintains or is otherwise associated with the communication device used by the caller 1 or the called party 2. For example, a caller 1, who is actually using a communication device to make a telephone call, may be borrowing another person's telephone to make the call. In this case, the lottery module 4 can determine that the person who owns the telephone or is responsible for paying for calls made using the telephone is eligible for entry into the lottery, rather than the actual caller.

In contrast, the lottery module 4 could determine whether the actual caller 1 should be associated with the call for lottery purposes, even if the caller 1 is not usually associated with the telephone being used to make a call. In this case, the caller 1 can enter an identification number, dial a specific access telephone number or follow some other procedure to identify the caller 1's identity to the lottery module 4 regardless of the telephone or other communication device being used to obtain communication services.

A called party 2 can be associated with the call for lottery purposes, for example, when a called party 2 receives, and therefore pays for, a "collect"-type call or "800"-type call. Other situations are possible where the called party 2 would be entitled to entry into a lottery. However, for ease of reference, the term associated party or lottery winner is used to refer to any person, group or other entity associated with the call for lottery purposes.

While communication services are being provided to the caller 1, the lottery module 4 determines whether the call is eligible for entry into a lottery and, if so, whether the call, and therefore the associated party, is a winner of the lottery. As discussed above, the call's odds of winning the lottery can be adjusted (e.g., increased), if desired, based on the associated party's past participation or call history, or other factors. If the associated party is a winner, the associated party or a member of the associated party, such as the caller 1 or called party 2, is preferably advised of the winning status while communication services are being provided. For example, the lottery module 4 could interrupt the call to advise the caller 1 of the winning status, call the caller 1 on another telephone line, display a video message on the caller 1's communication device or otherwise advise the caller 1 of the winning status. If the associated party is not a winner of the lottery, the lottery module 4 can either advise the caller 1 or called party 2 that the associated party did not win the lottery this time, or make no announcement at all. When the caller 1 or called party 2 wishes to terminate the communication services, e.g., by hanging up the telephone, the communication services are terminated. The lottery winner need not be advised that the lottery has been won while communication services are being provided. Instead, the lottery can be entered and won, and the lottery winner notified after communication services have been terminated.

When the lottery winner is notified that the lottery has been won, the lottery winner can be advised of the prize(s) won and given the option to refuse the prize(s) in return for a chance to win a better prize after a later lottery win, and/or increased odds of winning a better prize after a later lottery win. If the lottery winner refuses a prize after a lottery win, the lottery module 4 stores this information. If the lottery winner later wins another lottery, the lottery module 4 can determine the prize to be awarded to the lottery winner based on the stored information. For example, if a lottery winner wins and refuses a prize from prize tier A, when the lottery winner wins the lottery again, the lottery winner can be awarded a prize from a higher prize tier B. If the lottery winner refuses the prize from tier B, the lottery winner can be eligible to win a prize from a higher tier C, and so on.

Prizes can be selected from an inventory of prizes based on various criteria, such as a geographical origin of the call, a geographical destination of the call, a type of services provided during the call, prize preference information indicated by the lottery winner, and/or a participation history for the lottery winner that can include a number of calls or total call time during a past time period, a type of calls made, a number of past lotteries entered, a number of past lotteries won, call destination information, a time of day or day, and a dial-around code for past calls, etc.

Figure 2:
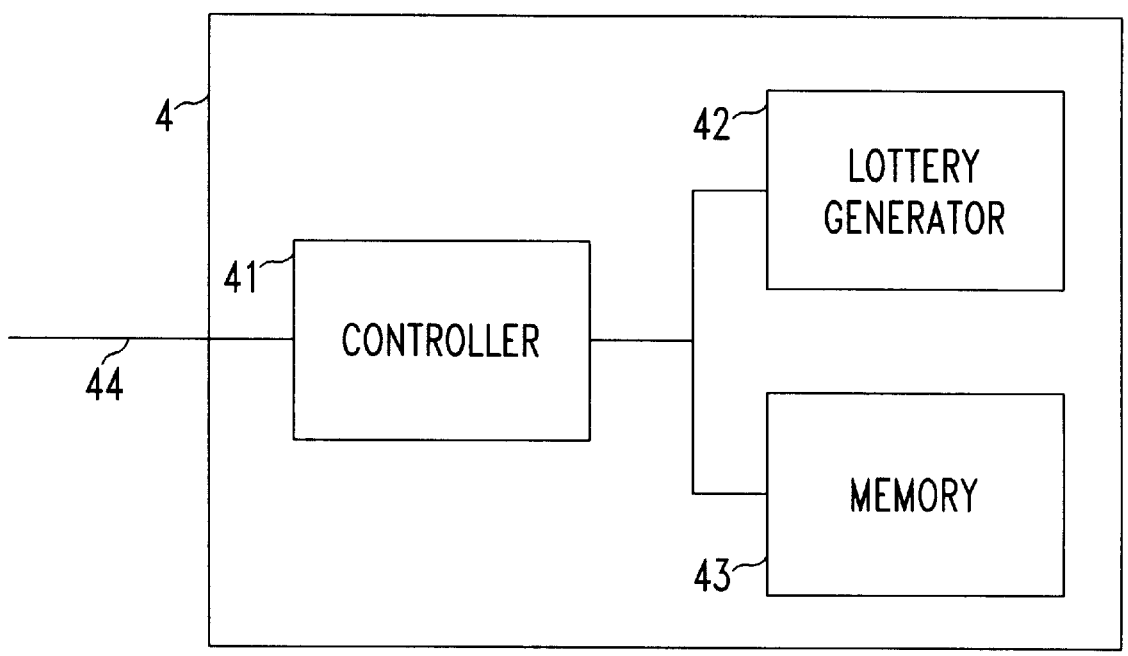
FIG. 2 is a schematic block diagram of a lottery module.

FIG. 2 is a schematic block diagram of one example of a lottery module. In this example, the lottery module 4 includes a controller 41 that receives and sends signals over a line 44, which communicates with the communication network 3. For example, the controller 41 can receive a signal over the line 44 from the communication network 3 indicating that a call request has been made and communication services are being provided to a caller 1. In response to the received signal, which can include information identifying the caller 1, the call's originating telephone number, the destination telephone number, other call destination information, etc., the controller 41 identifies the associated party for the call and determines whether the call is eligible for entry into a lottery. The associated party can be identified by comparing a caller 1's, called party 2's and/or other entity's identity (e.g., corresponding telephone number) to a stored set of information. Of course, other methods for identifying an associated party can be used, e.g., requesting a caller 1 to enter identifying information into a communication device.

The eligibility determination can be based on various factors including information received from the communication network 3 and/or other information stored in a memory 43. The memory 43 can store information such as a caller 1 or other entity's profile, including a number of calls made/received by the associated party during a past period of time, a total amount of call time used by the associated party, the types of calls made/received, etc. The controller 41 can also use information such as the time of day or day that a call is made, a specific dial-around code used to place a call, a call destination, or other information. In short, the controller 41 can use any desired information to make the eligibility determination. Alternately, all calls on the communications network 3 can be eligible for entry into a lottery.

Once the controller 41 determines that a call is eligible for entry into a lottery, the controller 41 sends a signal to a lottery generator 42 to enter the call into a lottery. The lottery generator 42 can enter the call into a standard lottery having defined odds and then provide an indication to the controller 41 whether the call has won the lottery. Alternately, the lottery generator 42 can adjust the odds of winning the lottery for the call based on the associated party's participation history, which can include any of the information discussed above. For example, the call's odds of winning can be adjusted based on past prizes won and refused by the associated party, a number of calls placed by the associated party during a past time period, a total call time logged by the associated party, the types of calls, e.g., credit card calls, dial-around calls, etc., a call destination such as a telephone number or geographical region, a time of day, a number of past entries into lotteries, a number of past lottery wins, etc. The odds of winning can be adjusted in any desired way, including providing the call with multiple entries into a lottery having predefined odds for winning, or providing the call with a single entry into a lottery that has adjusted odds.

If the call wins the lottery, the controller 41 sends a signal to the communication network 3 to notify the lottery winner of the winning status. Preferably, the lottery winner is notified while the call that prompted entry into the lottery is ongoing. However, the lottery winner can be notified after the call has been terminated. The lottery winner can be notified of the winning status in various ways, including providing a voice message to the lottery winner, displaying a message on the lottery winner's communication device, telephoning the lottery winner on a separate telephone line, sending a facsimile or e-mail message to the lottery winner, etc.

The controller 41 can also determine a prize or prizes that are awarded to the lottery winner. As discussed above, the prize(s) determined can be selected based on various criteria, including past lottery prizes won and refused, prize preference information indicated by the lottery winner, or other information that attempts to match the prize(s) to the lottery winner or the call that prompted the lottery win.

As one example, a caller 1 in New York can place a call to a called party 2 in California using a specific dial-around code. Communication services are provided to the caller 1 and called party 2 and the lottery module 4 receives an indication that the call is ongoing. In this example, the caller 1 is associated with the call for lottery purposes. Of course, the called party 2, a group of individuals or another entity, such as the owner of a telephone used by the caller 1 to make the call, can be associated with the call for lottery purposes. The controller 41 also determines whether the call is eligible for entry into a lottery based on desired criteria. For example, the fact that the caller 1 used the specific dial-around code could be enough to determine that the call is eligible for entry into a lottery. Alternately, other information, as discussed above, can be used for the eligibility determination. For example, the call could be determined eligible for entry into a lottery based on the fact that the caller 1 placed the call at a certain time of day or particular day of the week, e.g., on a Sunday. Likewise, the call could be determined eligible because the caller 1, who is associated with the call for lottery purposes, has made 20 or more calls during the past month, for example. Such eligibility determinations are not required, however, and each call indication received by the controller 41 could prompt entry into a lottery.

Once the call is determined to be eligible and a person, group or other entity is associated with the call for lottery purposes, the lottery generator 42 determines if the call has won the lottery. The call could be entered into a lottery having defined odds, e.g., one in ten thousand, or the call's odds of wining could be adjusted as discussed above. For example, the caller 1 could have won and returned a lottery prize in the past or made more than a threshold number of calls using a specific dial-around code during the last month, and therefore be entitled to increased odds of winning the lottery. Of course, other criteria can be used to determine whether and to what extent a call is entitled to adjusted odds of winning a lottery. Therefore, lottery winners who return prizes won during a lottery can be rewarded with increased odds of winning a subsequent lottery. One possible way of adjusting a call's odds is to provide the call with multiple entries into a lottery having defined odds. If the call wins the lottery, the lottery winner is advised of the winning status, preferably while communication services are being provided.

A prize or group of prizes can also be determined for the lottery winner. In this example, the caller 1 could be advised during the call of the selected prize(s). As discussed above, the prize(s) can be selected based on a participation history for the lottery winner or other call-related criteria. For example, the lottery winner may have won and refused/returned a prize from a relatively low prize tier A in the past and is now entitled to win a prize selected from a higher prize tier B. The lottery winner can also be given the opportunity to refuse the prize(s) in exchange for possibly higher odds of winning a prize from a higher prize tier in the future. The lottery winner can refuse the prize immediately after learning that the prize has been won, e.g., by pressing a key or series of keys on the communication device, or later indicate that the prize is refused, e.g., by e-mail message.

The controller 41 stores the refused prize information, e.g., in the memory 43, for later use in determining lottery odds and/or prize determination.

The lottery module 4 can be implemented, at least in part, as a general purpose data processor and/or single special purpose integrated circuit (e.g., ASIC) or an array of ASICs each having a main or central processor section for overall, system-level control and separate sections dedicated to performing various specific computations, functions and other processes under the control of the central processor section. The lottery module 4 can also be implemented using a plurality of separate dedicated programmable integrated or electronic circuits or devices, e.g., hard-wired electronic or logic circuits, such as discrete element circuits or programmable logic devices. The lottery module 4 also preferably includes other devices, such as volatile or non-volatile memory devices, communication devices, and/or other circuitry or components necessary to perform the desired input/output or other functions. For example, the lottery module 4 can include an interface, such as a user interface including a keyboard, monitor, user pointing device, etc. that allows an operator to input information into and receive information from the lottery module 4. The interface may also include other communications devices, including modems or other data communication devices, to allow the lottery module 4 to receive and send information.

The memory 43 can be one or more volatile and/or non-volatile memory devices, such as optical disks, magnetic media, semiconductor or other memory devices. The lottery generator 42 can be implemented as a software module that is executed by the controller 41 or any other suitable data processing apparatus. Alternately, the lottery module 42 can be implemented as hard-wired electronic circuits or other programmed integrated or other electronic circuits or devices, e.g., hard-wired electronic or logic circuits such as discrete element circuits or programmable logic devices.

Figure 3:
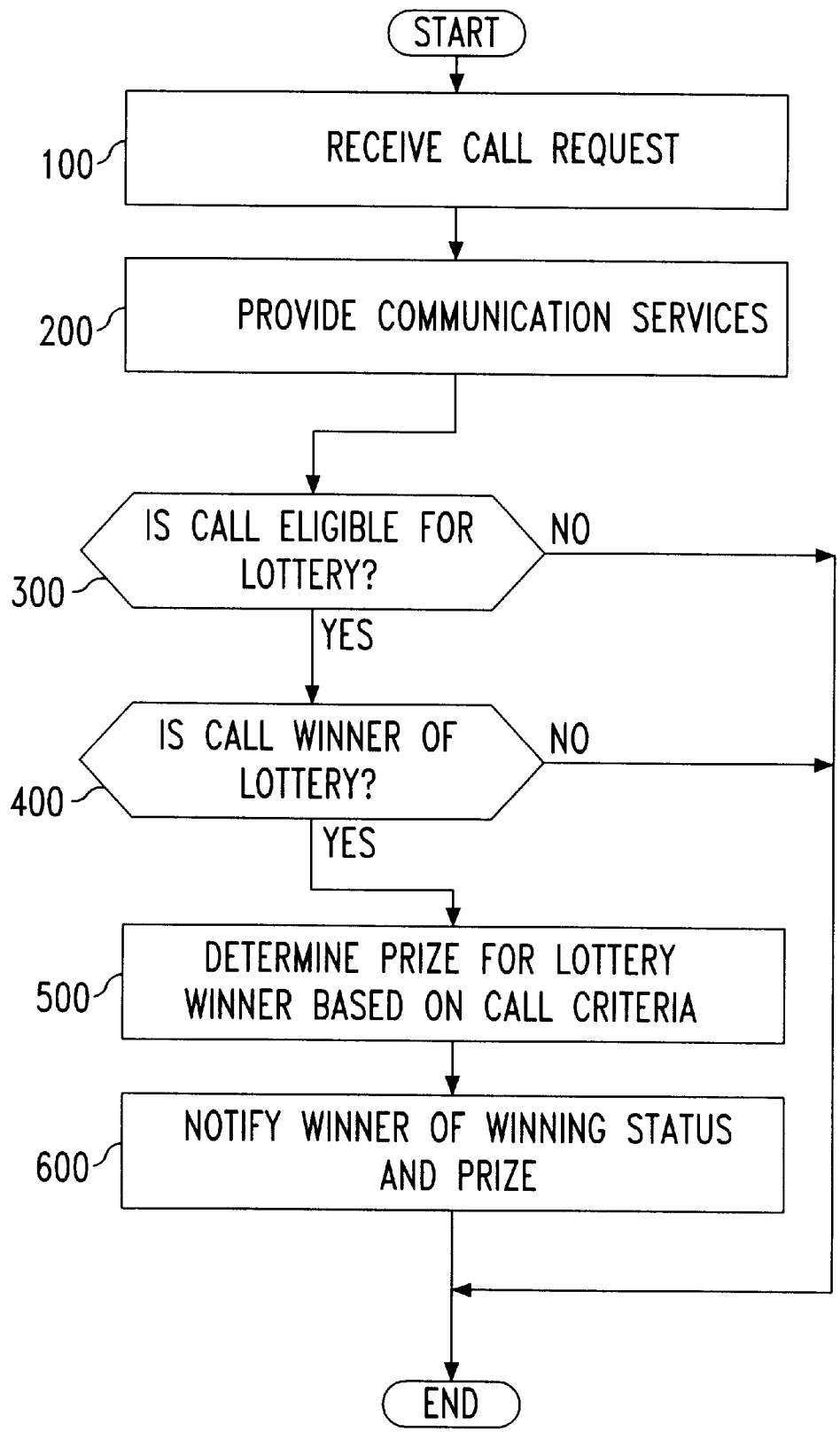
FIG. 3 is a flowchart of steps of a method for rewarding communication service users.

FIG. 3 is a flowchart of steps of a method for rewarding communication service users. In step 100, a call request is received from a caller. For example, a call request can be a dialed telephone number or other number sequence using a telephone linked to a telecommunications network. However, the call request can be any signal or other indication that a caller would like to communicate with a called party using any type of communications system, e.g., a request to connect to a particular Internet web page or view/interact with a particular communication channel. In step 200, communication services are provided to allow communication between the caller and a called party. The communication services can include transmitting voice and/or data communications between the caller and the called party. However as discussed above, the communication services can be provided by any communication system, not just telecommunications systems.

In step 300, a determination is made whether the call is eligible for a lottery. The eligibility determination can be based on various different eligibility criteria such as information regarding an associated party's participation history including a number of calls or total call time for the associated party during a past time period, or other information related to the call such as a time of day, a call destination (e.g., a specific telephone number or geographic region), a dial-around code used to place the call whether the call was made using a credit card, etc. This determination can be made by comparing the eligibility criteria obtained regarding the call with stored eligibility data. For example, a dial-around number used to initiate the call can be compared with a set of stored dial-around numbers; and if the obtained dial-around number matches one of the stored numbers, the call can be determined eligible for entry into a lottery. Of course, the eligibility determination can be made based on two or more criteria in any way as desired. For example, even if a dial-around number used to make a call matches a stored dial-around number, a further determination can be made whether the number of calls placed by the associated party during the last month is equal to or greater than a desired threshold number. Thus, even if the caller used an appropriate dial-around number that would otherwise entitle the call entry into a lottery, if the associated party has not placed a specified number of calls using the dial-around number in the past, entry into a lottery can be denied.

If the determination whether a call is eligible for a lottery is based on specific information related to the associated party, an additional step can be performed to identify the associated party. However, if the determination whether a call is eligible for a lottery is based on other information, such as the type of call, the associated party need not be identified until later, if at all. Preferably, the eligibility determination is made while communication services in step 200 are being provided. If the call is not eligible for a lottery, flow jumps to the end of the flowchart, at which time the associated party, such as the caller, can be advised that the call is not eligible for a lottery. However, the associated party need not be advised that the call has been denied entry into a lottery.

If the call is eligible for a lottery, a determination is made in step 400 whether the call is a winner of the lottery. This determination can be made in any number of different ways, including using a random number generator to generate a number and then determine whether the randomly generated number matches or otherwise corresponds to a number associated with the call. The number assigned to the call can be a number that is assigned permanently to an associated party, or can be assigned to the call when the call is entered into a lottery. However, the call can be determined to be a winner of the lottery in other ways.

For example, the call's odds of winning the lottery can be adjusted based on a call participation history for the associated party. The participation history can include information such as a number of calls recently made by the associated party, a total call time logged by the associated party, etc. For example, a call's odds of winning the lottery can be increased if the associated party has won, but refused/returned a lottery prize in the past or made more than a threshold number of calls during a past time period. The call's odds of winning can be adjusted by adjusting a number of entries allotted to the call into a lottery, adjusting the odds of winning the lottery, etc.

The term lottery is used herein to refer to a game of chance or pseudo-game of chance such that the caller has a random, or pseudo-random chance of winning. Thus, the lottery can be constructed to give the appearance of random winning, when in fact the probability for a call winning the lottery is adjusted based on various criteria, including a total number of calls made or call minutes used by an associated party during a recent past time period, the types of calls, e.g., credit card calls, dial-around calls, etc., a call destination such as a telephone number or geographical region, a time of day, a number of past entries into lotteries, a number of past lottery wins, prizes refused, etc.

In step 500, a prize or group of prizes is determined for the associated party, now the lottery winner. As discussed above, the prize(s) determined can be selected based on criteria including a geographical origin of the call, a geographical destination of the call, a type of services provided during the call, prize preference information indicated by the lottery winner, and/or a participation history for the lottery winner that can include past prizes won and refused, a number of calls or total call time during a past time period, a type of calls made, a number of past lotteries entered, a number of past lotteries won, call destination information, a time of day or day, and a dial-around code for past calls, etc.

For example, if the lottery winner won and refused a prize from tier A in the past, the lottery winner can be entitled to a prize from a higher prize tier B. The prize can be selected from an inventory of prizes in the prize tier B based on any of the criteria described above, or other criteria as desired. Thus, a prize that closely matches the call or desires of the lottery winner can be selected. For example, if the lottery winner frequently calls between New York and California, the selected prize could be an airline ticket for travel between New York and California. Alternately, the lottery winner can be given a choice of prizes within an appropriate prize tier, and/or given the opportunity to refuse the prize in return for possibly increased odds of winning a better prize, or selection of prizes, in the future.

If the call is determined to be a winner of the lottery, the lottery winner is advised of the winning status in step 600. For example, a lottery winner can be advised while the communication services are being provided, or after the communication services have been terminated. The lottery winner can be advised of the winning status in any number of different ways, including providing the lottery winner with a voice or visual message, a facsimile or e-mail transmission, etc. The lottery winner can also be given the opportunity to refuse the prize in exchange for a chance to win a better prize at possibly increased odds in the future.

While this invention has been described in conjunction with specific embodiments thereof, it is evident that many alternatives, modifications, and variations will be apparent to those skilled in the art. Accordingly, the embodiments of the invention as set forth herein are intended to be illustrative, not limiting. Various changes may be made without departing from the spirit and scope of the invention.

What is claimed is:

1. A method for rewarding communication service users, comprising:
   receiving an indication that communication services are to be provided to a caller so that the caller can at least receive information from a called party during a call;
   identifying a party associated with the call for lottery purposes;
   determining if the call is eligible for entry into a lottery;
   determining if the call is a winner of the lottery;
   advising the associated party that the associated party is a lottery winner while providing communication services to the caller and the called party; and
   providing the lottery winner with an option to refuse a prize offered as a result of winning the lottery in exchange for a chance to win a better prize during a subsequent lottery.

2. The method of claim 1, wherein the step of receiving an indication that communication services are to be provided comprises receiving a signal representing at least one of a telephone number and a dial-around number.

3. The method of claim 1, wherein the step of receiving an indication that communication services are to be provided comprises sending information between the caller and the called party at least in part through a computer network.

4. The method of claim 1, wherein the step of identifying a party associated with the call comprises identifying at least one of the caller and the called party as the associated party.

5. The method of claim 1, wherein the step of determining if the call is a winner of the lottery comprises adjusting the call's odds of winning the lottery based on a participation history for the associated party.

6. The method of claim 1, wherein the step of determining if the call is a winner of the lottery comprises comparing a participation history for the associated party to stored odds of winning criteria, wherein the participation history includes at least one of a number of past lotteries entered, a number of past lotteries won, a total number of calls made during a previous time period, a total amount of call time logged during a previous time period, a type of calls made, call destination information, a time of day or day, and a dial-around code for past calls.

7. The method of claim 1, wherein the step of determining if the call is a winner of the lottery comprises increasing an odds of winning for the call if the associated party has previously won and refused a lottery prize.

8. The method of claim 1, wherein the step of providing a lottery winner with an option comprises determining a prize based on whether the lottery winner has won and refused a prize in a previous lottery win.

9. The method of claim 1, further comprising selecting a prize from an inventory database to match at least one of the call and a lottery winner's preference as closely as possible.

10. A lottery device associated with a communication system that provides communication services so that a caller can at least receive information from a called party during a call, the lottery device comprising:
    a memory that stores information regarding at least a participation history for an associated party that is not the caller;
    a lottery generator that determines if a call has won a lottery; and
    a controller that identifies the associated party for lottery purposes, determines if the call is eligible to enter the lottery, and advises the associated party that the associated party has won the lottery.

11. The lottery device of claim 10, wherein the controller selects a prize from a relatively higher prize tier if the lottery winner has won and refused a lottery prize in the past.

12. The lottery device of claim 10, wherein the communication system is a telecommunications network.

13. The lottery device of claim 10, wherein the communication system is at least in part a computer network.

14. The lottery device of claim 10, wherein the lottery generator adjusts a call's odds of winning the lottery based on a participation history for the associated party.

15. The lottery device of claim 10, wherein the lottery generator adjusts a call's odds of winning the lottery based on a comparison of a participation history for the associated party to stored odds of winning criteria, wherein the participation history includes at least one of past lottery prizes refused, a number of past lotteries entered, a number of past lotteries won, a total number of calls made by the associated party during a previous time period, a total amount of call time logged by the associated party during a previous time period, a type of calls made, call destination information, a time of day or day, and a dial-around code for past calls.

16. The lottery device of claim 10, wherein the lottery generator increases an odds of winning for the call if the associated party has previously won and refused a lottery prize.

17. The lottery device of claim 10, wherein the controller advises the lottery winner that the lottery winner has won the lottery while providing communication services to the caller and the called party.

18. A method for rewarding communication service users, comprising:

receiving an indication that communication services are to be provided to a caller so that the caller can at least receive information from a called party during a call;

identifying a party that is not the caller as a party associated with the call for lottery purposes;

determining if the associated party is eligible for entry into a lottery;

determining if the associated party is a winner of the lottery; and advising the associated party that the associated party is a lottery winner.

19. The method of claim 18, wherein the step of determining if the associated party is a winner of the lottery comprises comparing a participation history for the associated party to stored odds of winning criteria, wherein the participation history includes at least one of a number of past lotteries entered, a number of past lotteries won, a total number of calls made during a previous time period, a total amount of call time logged during a previous time period, a type of calls made, call destination information, a time of day or day, and a dial-around code for past calls.

20. The method of claim 18, further comprising providing the lottery winner with an option to refuse a prize offered as a result of winning the lottery in exchange for a chance to win a better prize during a subsequent lottery.

21. The method of claim 18, wherein the step of identifying a party associated with the call comprises identifying the called party as the associated party.

22. The method of claim 18, wherein the step of determining if the associated party is a winner of the lottery comprises adjusting odds of winning the lottery based on a participation history for the associated party.

* * * * *